(12) United States Patent
Tan

(10) Patent No.: US 8,395,826 B2
(45) Date of Patent: Mar. 12, 2013

(54) SCANNING DEVICE

(76) Inventor: Hin Leong Tan, Sunnyvale, CA (US)

( * ) Notice: Subject to any disclaimer, the term of this patent is extended or adjusted under 35 U.S.C. 154(b) by 623 days.

(21) Appl. No.: 12/626,664

(22) Filed: Nov. 26, 2009

(65) Prior Publication Data

US 2010/0073742 A1 Mar. 25, 2010

Related U.S. Application Data

(63) Continuation-in-part of application No. 12/077,432, filed on Mar. 17, 2008, now Pat. No. 7,973,985.

(51) Int. Cl.
*H04N 1/04* (2006.01)

(52) U.S. Cl. ......... 358/474; 358/498; 358/497; 358/496

(58) Field of Classification Search .................. 358/474, 358/498, 497, 496, 501
See application file for complete search history.

(56) References Cited

U.S. PATENT DOCUMENTS

| | | | | |
|---|---|---|---|---|
| 5,768,448 A | * | 6/1998 | Ichinose | 382/312 |
| RE43,358 E | * | 5/2012 | Fujikawa et al. | 358/474 |
| 2002/0105686 A1 | * | 8/2002 | Hasegawa et al. | 358/498 |

* cited by examiner

*Primary Examiner* — Houshang Safaipour
(74) *Attorney, Agent, or Firm* — Douglas L. Weller

(57) ABSTRACT

A scanning device comprising a first image sensor, a second image sensor module and a housing. The first image sensor module has a first image array sensor for scanning information from a first side of media. The second image sensor module is mounted opposite the first image sensor module so that the media can move to a scanning region between the first image sensor module and the second image sensor module. The second image sensor module has a second image array sensor for scanning information from a second side of the media. A housing is attached to the second image sensor module. When the media moves to the scanning region between the first image sensor module and the second image sensor module and exits the scanning region, when the media reenters the scanning region, the media impacts a convex region of the housing that causes the second image sensor module to move with respect to the first image sensor module and to thus provide sufficient separation distance between the second image sensor module and the first image sensor module to allow the media to re-enter the scanning region.

18 Claims, 7 Drawing Sheets

SCANNING DEVICE

CROSS REFERENCE TO RELATED APPLICATIONS

This application is a continuation-in-part of co-pending United States patent application entitled "SCANNING DEVICE" filed on Apr. 7, 2008 and accorded Ser. No. 12/077, 432.

BACKGROUND

Currently available compact optical card scanning devices are generally single sided scanning devices that scan cards one side at a time. Additionally, currently available optical card scanning devices are typically designed to handle thinner material such as business cards, and are generally unable to accommodate thick plastic cards, and especially those that have raised or embossed lettering. Such thick rigid material tends to jam in the feeding mechanism that moves the card through the scanning device.

However, for security and commercial billing purposes, there is an increasing need to reliably capture the images of rigid laminated and plastic cards. These cards proliferate as identification material for many in different areas in the form of insurance cards, driver licenses, and credit cards. With the advance of imaging technology and digital storage, many health clinics for instance prefer to scan and save digital images of plastic insurance cards than to photocopy and save hard copies on the copy machine.

DESCRIPTION OF THE EMBODIMENT

Figure 1:
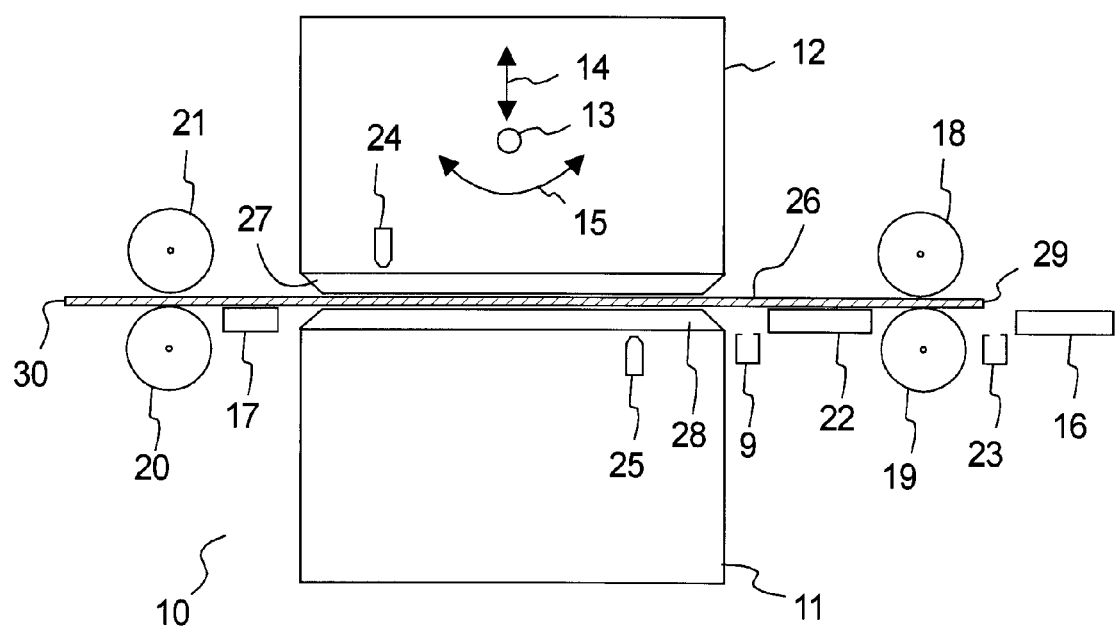
FIG. 1 is a simplified cross-sectional view illustrating a scanning device that scans two sides of media.

FIG. 1 is a simplified cross-sectional view illustrating a scanning device 10 scanning both sides of media 26 fed into scanning device 10 by feed roller 18 and feed roller 19 located at a front side of scanning device 10.

Media 26 is placed on a media tray portion 16 and placed adjacent to feed rollers 18 and 19. For example, media 26 is a business card, or some other type of media with information on one or both sides. A document detector 23 detects the presence of media 26. As a result, feed rollers 18 and 19 begin to rotate so as to feed media 26 over media tray portion 22 and between a glass plate 27 of an upper contact imaging sensor module 12 and a glass plate 28 of a lower contact imaging sensor 11. Upper contact imaging sensor 12 makes room for media 26 either by moving up with respect to lower contact imaging sensor 11, as represented by arrow 14, or by rotating around a pin 13, as represented by arrow 15. For further information about how media, even thick media, can be fed between an upper contact imaging sensor and a lower contact imaging sensor, see co-pending United States patent application entitled "SCANNING DEVICE" filed on Apr. 7, 2008 and accorded Ser. No. 12/077,432, which is incorporated herein by reference.

As media 26 passes between upper contact imaging sensor module 12 and lower contact imaging sensor 11, an image array sensor 24 scans the top surface of media 26 while an image array sensor 25 scans the bottom surface of media 26. As media 26 begins to exit through the back side of scanning device 10, media is fed over a media tray portion 17 into a roller 21 and a roller 20. Roller 21 and roller 20 operate synchronous with roller 18 and roller 19 to allow media 26 to continue to travel through scanning device 10 even when media 26 is no longer in contact with roller 18 and roller 19.

Document detector 23 detects when an end 29 of media 26 has passed document detector 23. Once end 29 of media 26 has passed document detector 23, roller 20 and roller 21 continue moving media 26 until scanning device 10 has estimated that end 29 of media 26 has passed by image array sensor 24. Then, roller 20, roller 21, roller 18 and roller 19 stop, reverse direction, and begin feeding media 26 back through scanning device 10, over media tray portion 22, through roller 18 and roller 19 and over media tray portion 16. Rollers 18 and 19 continue moving media 26 until an end 30 of media 26 has passed back through roller 18 and roller 19. An optional document detector 9 can be included and used instead of, or along with, document detector 23 to determine to estimate when end 29 of media 26 has passed by image array sensor 24.

Figure 2:
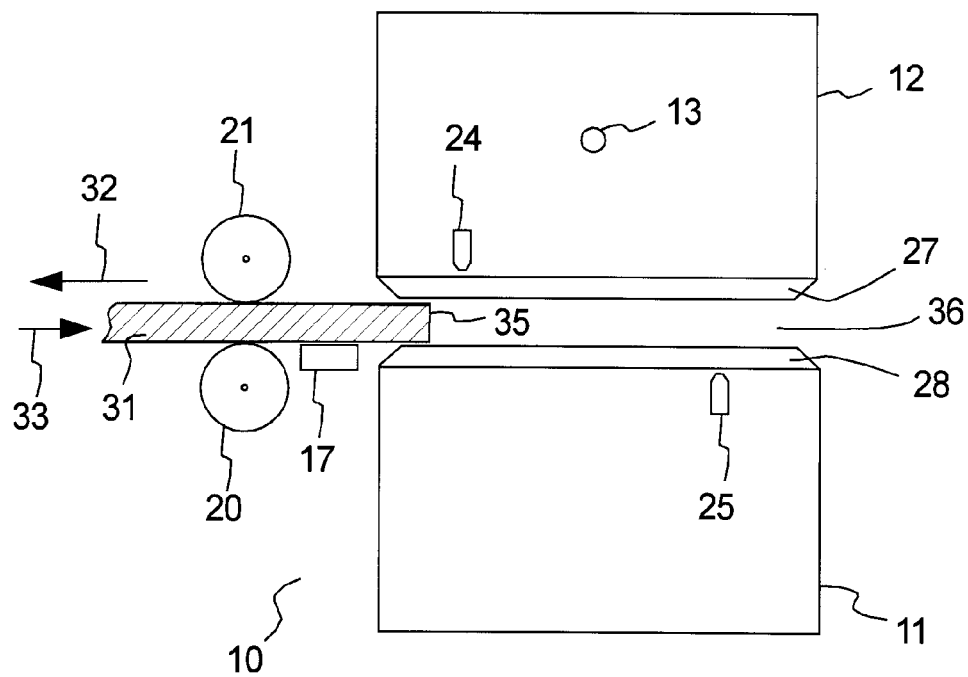
FIG. 2 and FIG. 3 illustrate how the scanning device shown in FIG. 1 can fail to allow a thick card from properly returning through the scanning device shown in FIG. 1.

Media 26 represents media that is relatively thin. Scanning device 10 can also be adapted to work with thicker media, as represented by media 31 shown in FIG. 2. As illustrated in FIG. 2, document detector 23 (shown in FIG. 1) detects when an end 35 of media 31 has passed document detector 23. Once end 35 of media 31 has passed document detector 23, roller 20 and roller 21 continue moving media 26 in the direction represented by arrow 32 until scanning device 10 has estimated that end 35 of media 31 has passed by image array sensor 24. Then, roller 20, roller 21, roller 18 and roller 19 stop, reverse direction, and begin feeding media 31 in the direction represented by arrow 33 back through scanning device 10, over media tray portion 22, through roller 18 and roller 19 and over media tray portion 16 (shown in FIG. 1) until media 31 has exited scanning device 10.

Because of latency in controlling rollers 21 and 20, it is sometimes difficult to accurately estimate from the data supplied by document detector 23 exactly when end 35 has passed by image array sensor 24. Therefore, it is possible that end 35 of media 31 will overshoot with the result that end of media 31 will exit the scanning region between glass plate 27 of upper contact imaging sensor module 12 and glass plate 28 of lower contact imaging sensor 11. When this happens upper contact imaging sensor module 12 will return down to rest upon lower contact imaging sensor module 11 eliminating a gap 36 between upper contact imaging sensor module 12 and lower contact imaging sensor module 11, as illustrated by FIG. 3.

Figure 3:
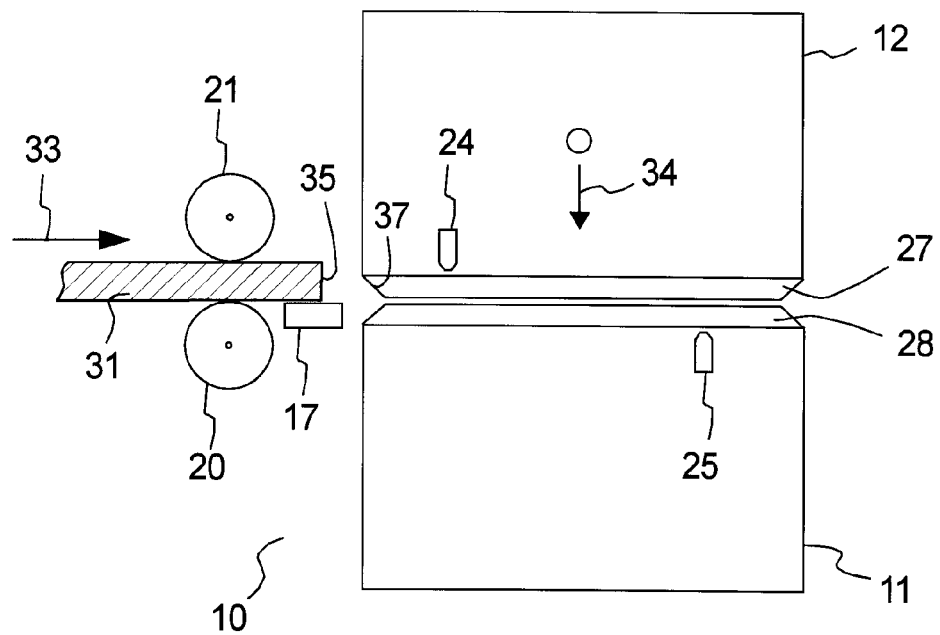

In FIG. 3, upper contact imaging sensor module 12 rests upon lower contact imaging sensor module 11. If media 31 were sufficiently thin, rollers 20 and 21 would push media 31 against beveled edge 37 of glass plate 27 and beveled edge 38 of glass plate 38 causing upper contact imaging sensor module 12 to move away from lower contact imaging sensor module 11 and making room for media 31 to travel back through scanning device 10. However, if media 31 is so thick that its upper surface extends higher than the top of beveled edge 37 of glass plate 27, the result can be a jam as a result of upper contact imaging sensor module 12 not moving away from lower contact imaging sensor module 11 and there being no room for media 31 to travel back through scanning device 10.

Figure 4:
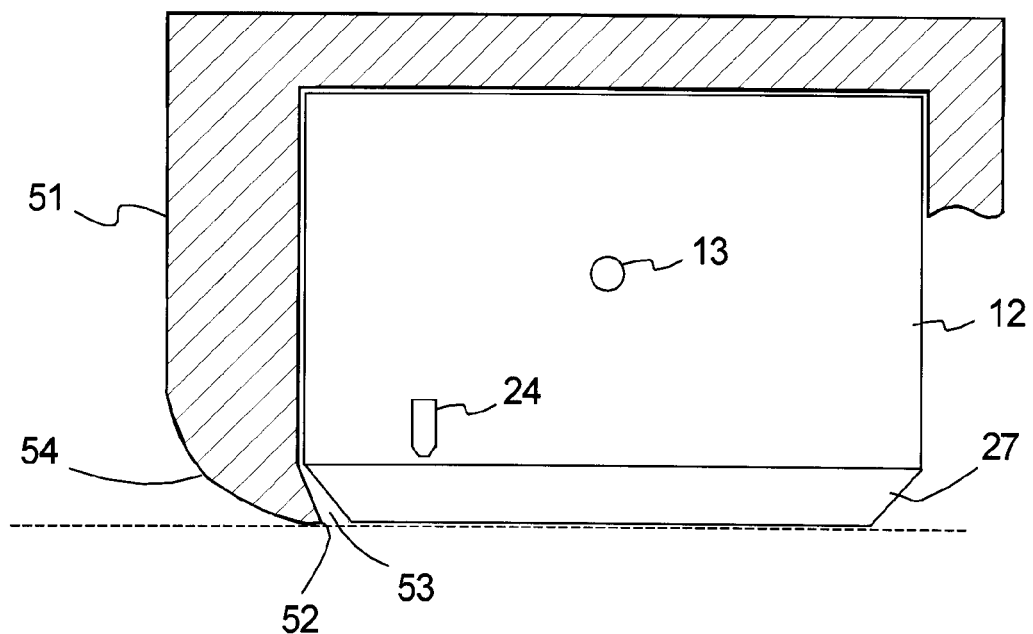
FIG. 4 shows a housing that can be added to the scanning device shown in Figure to facilitate the successful return of a thick card through the scanning device shown in FIG. 1.

To prevent jamming a housing 51 can be added to upper contact imaging sensor module 12, as shown in FIG. 4. A tip 52 of housing 51 should not extend below a bottom surface of glass plate 27 because if tip 52 of housing 51 were to extend below the bottom surface of glass plate 27, tip 52 may catch the leading edge of media as it is being fed through and scanned by scanning device 10.

A gap 53 between tip 52 of housing 51 and the beveled portion of glass plate 27 can be left open, or be filled in, for example, with a fill material.

When housing 51 is added to upper contact imaging sensor module 12, this eliminates the problem of jamming when there is an overshoot in the feeding of media 31. That is 51 prevents jamming when media end 35 of media 31 is fed past upper contact imaging sensor module 12 and upper contact imaging sensor module 12 returns down to rest upon lower contact imaging sensor module 11 eliminating the gap 36 between upper contact imaging sensor module 12 and lower contact imaging sensor module 11. When, rollers 20 and 21 push end 35 of media 31 against housing 51, a convex edge 54 of housing 51 causes upper contact imaging sensor module 12 to move away from lower contact imaging sensor module 11 and thus makes room for media 31 to travel back through scanning device 10.

Figure 5A:
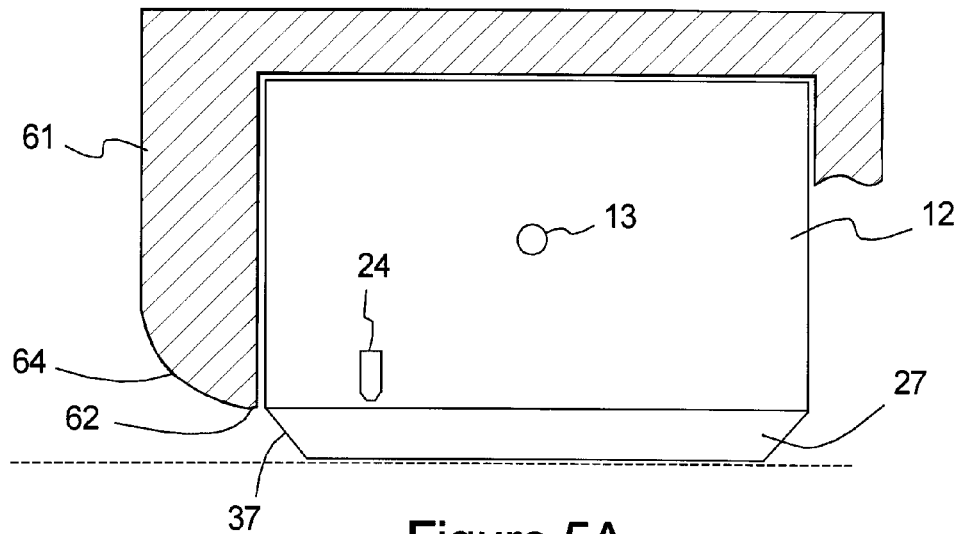
FIG. 5A, FIG. 5B and FIG. 5C show alternative embodiments of the housing shown in FIG. 4.

FIG. 5A shows an alternative embodiment where a tip 62 of housing 61 added to upper contact imaging sensor module 12 extends down only to the top of glass plate 27. Housing 61 prevents jamming when media end 35 of media 31 is fed past upper contact imaging sensor module 12 so that upper contact imaging sensor module 12 returns down to rest upon lower contact imaging sensor module 11 eliminating the gap 36 between upper contact imaging sensor module 12 and lower contact imaging sensor module 11. When rollers 20 and 21 push end 35 of media 31 against housing 61, a convex edge 64 of housing 61 and beveled edge 37 of glass plate 27 cause upper contact imaging sensor module 12 to move away from lower contact imaging sensor module 11 and make room for media 31 to travel back through scanning device 10.

Housing 61 prevents jamming when media end 35 of media 31 is fed past upper contact imaging sensor module 12 so that upper contact imaging sensor module 12 returns down to rest upon lower contact imaging sensor module 11 eliminating the gap 36 between upper contact imaging sensor module 12 and lower contact imaging sensor module 11.

Figure 5B:
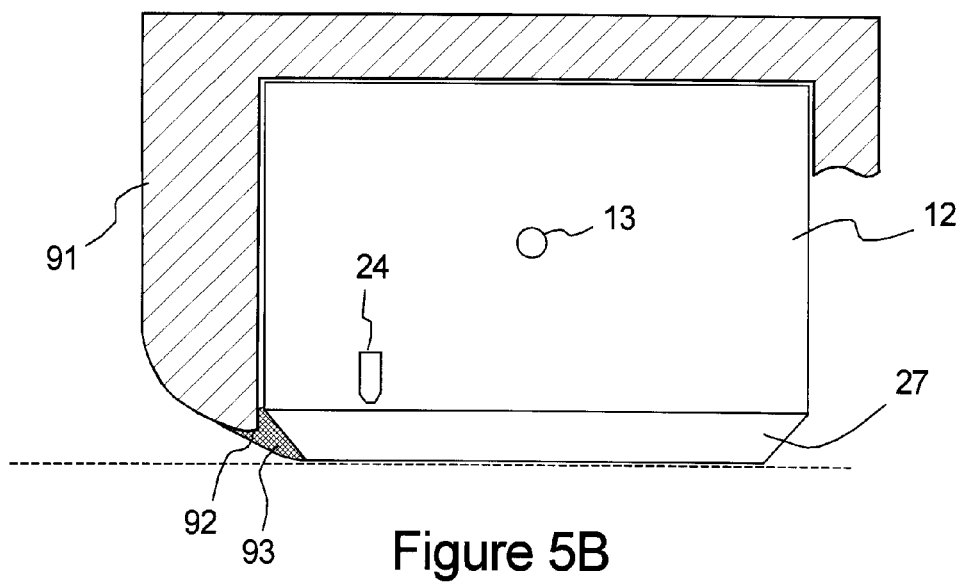

FIG. 5B shows another alternative embodiment where a tip 92 of housing 91 added to upper contact imaging sensor module 12 extends part way down glass plate 27. Fill material 93 can be used to fill any gap between tip 92 and glass plate 27.

Figure 5C:
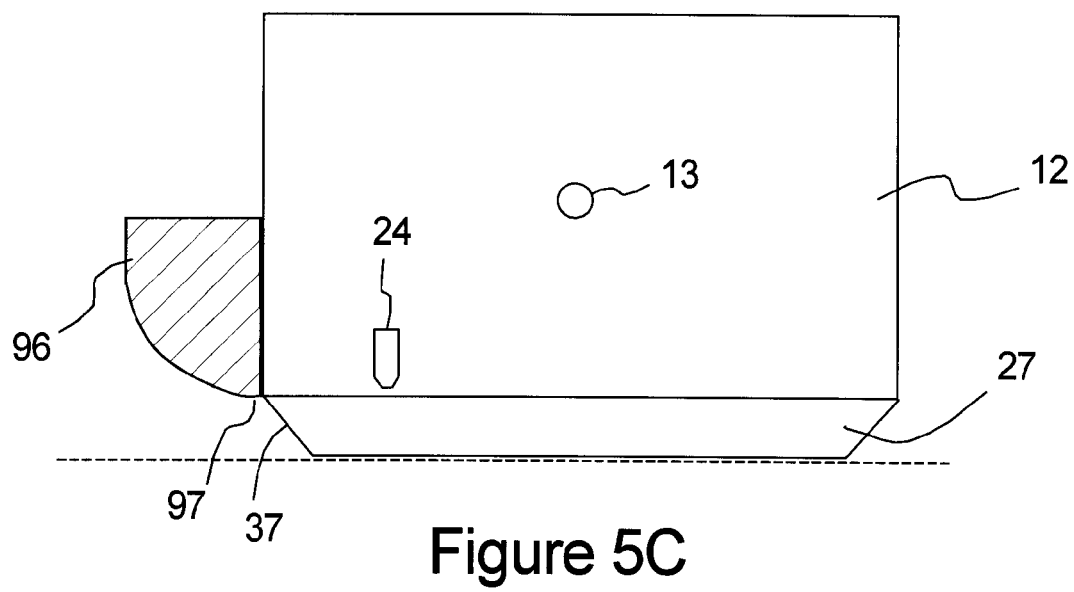

An abbreviated feeder section can be used in place of the housing shown in FIGS. 4, 5A and 5B. For example, FIG. 5C shows an alternative embodiment where a tip 97 of a feeder section 96 attached to upper contact imaging sensor module 12 extends down only to the top of glass plate 27.

Image array sensor 24 can also be used to detect edge 35 of media 31 reducing the latency in controlling rollers 21 and 20. This increased resolution in the determination of when edge 35 of media 31 has passed image array sensor 24 prevents media feed overshoot so that end 35 of media 31 does not exit the gap between upper contact imaging sensor module 12 and lower contact imaging sensor module 11. This prevents the jamming that can occur when upper contact imaging sensor module 12 returns down to rest upon lower contact imaging sensor module 11 blocking media 31 from returning through scanning device 10.

Figure 7:
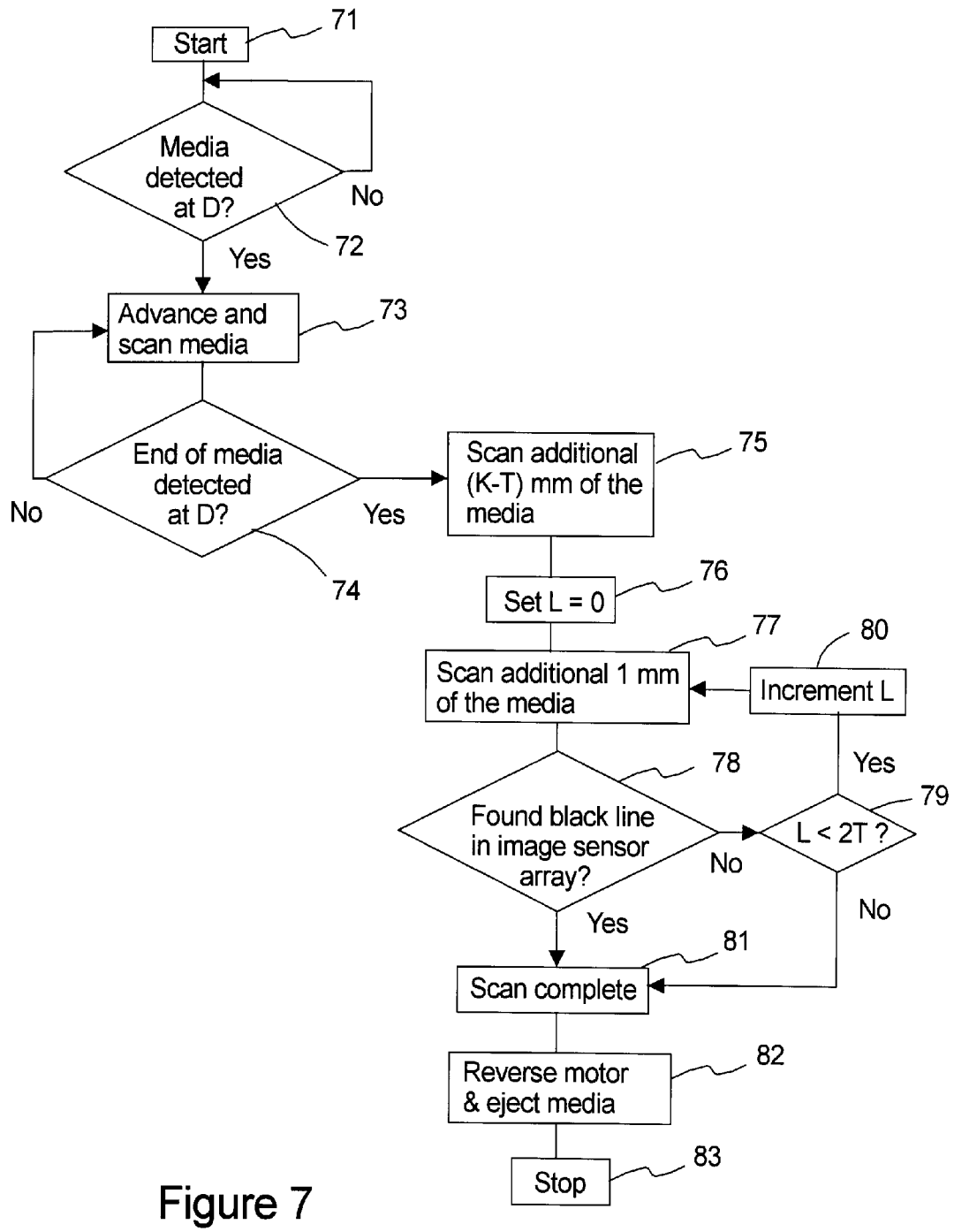
FIG. 7 is a flowchart illustrating how an image array sensor within a contact imaging sensor module is used to determine when to eject media from the scanning device shown in FIG. 1.

FIG. 7 is a flowchart illustrating an efficient way to use image array sensor 24 to perform edge detection. Once turned on, scanning device 10 enters a start block 71 and then a block 72, where scanning device 10 waits for document detector 23 to detect the leading edge of media to be fed into scanning device 10. When document detector 23 detects media ready to be scanned, scanning device 10, in block 73, turns on motors for rollers 18, 19, 20 and 21 causing the media to be fed between upper contact imaging sensor module 12 and lower contact imaging sensor module 11 where one or both sides of the media is scanned. In block 74, as scanning device 10 is scanning the document, document detector 23 watches for the trailing edge of the media.

Figure 6:
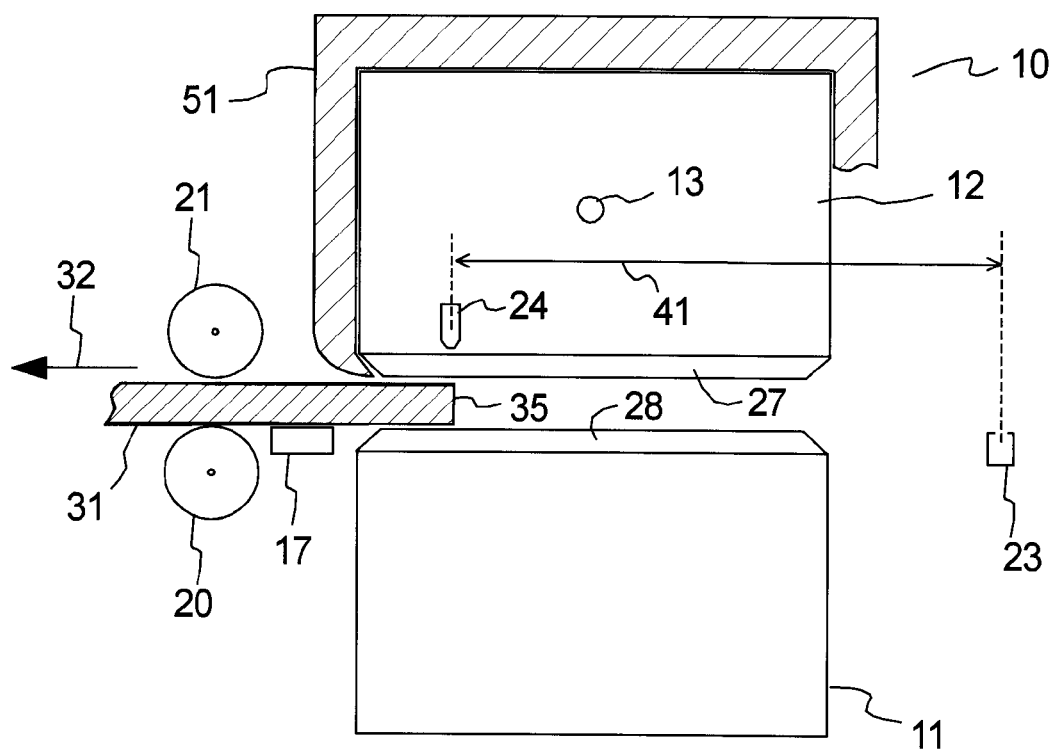
FIG. 6 is a simplified cross-sectional view of the scanning device shown in FIG. 1 illustrating how images scanned by an image array sensor within a contact imaging sensor module can be used to reduce overfeed of media.

When the trailing edge is detected, in a block 75, an additional amount of the media is scanned. For example, if the distance the trailing edge travels from document detector 23 to image array sensor 24 is equal to a distance K, represented as distance 41 in FIG. 6, then an additional length of the media K-T is scanned, where K-T is some distance less than K, based on the latency in controlling rollers 21 and 20. T is selected large enough so that, taking into account the latency in controlling rollers 21 and 20, the trailing edge will still be between upper contact imaging sensor module 12 and lower contact imaging sensor module 11 when the length K-T is reached. However, T is small enough to limit the number of times image array sensor 24 checks for the trailing edge of the media.

In a block 76 a counter L is set to 0. Counter L represents the total of the incremental amounts of length of the media that has been scanned after block 75. In a block 77, an incremental amount of length (e.g., 1 millimeter) of the media is scanned. In a block 78, a check is made to see if image array sensor 24 has detected the trailing edge of the media. For example, when image array sensor 24 detects a black line, this indicates the trailing edge of the media. If image array sensor 24 has not detected the trailing edge of the media, in block 79 a check is made to see if L is equal to some predetermined distance. For example, the predetermined distance is equal to 2T. If the distance is not reached, in a block 80, L is incremented and in block 77 an additional increment of the media is scanned.

If in block 79 L is equal to or greater than some predetermined distance, in a block 81, the scan is complete. Likewise, if in block 78 image array sensor 24 has detected the trailing edge of the media, the scan is complete. When the scan is complete, in block 82, motors driving rollers 20, 21, 18 and 19 are reversed and the media is backed out of scanning device 10. In a block 83, the scan is completed and the scanning device can return to block 71.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A scanning device comprising:
    a first image sensor module, the first image sensor module having a first image array sensor for scanning information from a first side of media;
    a second image sensor module, the second image sensor module being mounted opposite the first image sensor module so that the media can move to a scanning region between the first image sensor module and the second image sensor module, the second image sensor module having a second image array sensor for scanning information from a second side of the media;
    a housing attached to the second image sensor module the housing having a convex region, the housing moving the second image sensor module away from the first sensor module to accommodate thickness of the media; and a transport mechanism that moves the media into and through the scanning region between the first image sensor module and the second image sensor module, the transport mechanism then reversing direction of the media so that the media travels through the scanning region to exit the scanning region at a same location at which the media was first moved into the scanning region;
    wherein when latency in the transport mechanism reversing direction causes the media to travel so far outside the scanning region that the second image sensor module moves closer to the first sensor module, the transport mechanism causes the media to reenter the scanning region so that the media impacts the convex region of the housing causing the second image sensor module to move with respect to the first image sensor module and to thus provide sufficient separation distance between the second image sensor module and the first image sensor module to allow the media to reenter the scanning region.

2. A scanning device as in claim 1 wherein the transport mechanism comprises:
    a first pair of rollers, the first pair of rollers feeding the media to the scanning region between the first image sensor module and the second image sensor module; and,
    a second pair of rollers which when the media moves to a scanning region between the first image sensor module and the second image sensor module and exits the scanning region, the second pair of rollers returns the media back to the scanning region.

3. A scanning device as in claim 1:
    wherein the second image sensor module includes a glass plate along which the media moves and through which the media is scanned; and
    wherein the housing includes a tip that extends almost, but not quite to a plane of the glass plate along which the media moves.

4. A scanning device as in claim 1:
    wherein the second image sensor module includes a glass plate along which the media moves and through which the media is scanned; and
    wherein the housing includes a tip that extends approximately to a plane of the glass plate which is farthest from a parallel plane of the glass plate along which the media moves.

5. A scanning device as in claim 1 wherein as the media is being fed through the scanning device, the scanning device reverses direction of media feeding when the second image array sensor detects a trailing end of the media.

6. A scanning device as in claim 1 additionally comprising:
    a document detector;
    wherein when the document detector detects media, the media is fed through the scanner; and
    wherein the scanning device reverses direction of media feeding when the second image array sensor detects a trailing end of the media.

7. A scanning device as in claim 1 additionally comprising:
    a first pair of rollers;
    a second pair of rollers; and
    a document detector;
    wherein when the document detector detects media, the first pair of rollers feed the media through the scanner; and
    wherein when the second image array sensor detects a trailing end of the media the second pair of rollers reverses direction of media feeding.

8. A scanning device comprising:
    a document detector; and
    an image sensor module, the image sensor module having an image array sensor for scanning information from a side of media;
    wherein as the media is being fed through the scanning device, the scanning device reverses direction of media feeding when the image array sensor detects a trailing end of the media; and,
    wherein when the document detector detects the trailing end of the media, the scanning device scans an additional length just sufficient for the trailing end of the media to almost reach the image sensor module and then begins using the image sensor module to check for the trailing end of the media.

9. A scanning device as in claim 8 wherein when the document detector detects media, the media is fed through the scanner.

10. A scanning device as in claim 8 additionally comprising:
    a first pair of rollers; and
    a second pair of rollers;
    wherein when the document detector detects media, the first pair rollers feed the media through the scanner; and
    wherein when the image array sensor detects a trailing end of the media the second pair of rollers reverses direction of media feeding.

11. A scanning device as in claim 8 additionally comprising:
    a second image sensor module, the second image sensor module being mounted opposite the image sensor module so that the media can move to a scanning region between the image sensor module and the second image sensor module, the second image sensor module having a second image array sensor for scanning information from a second side of the media.

12. A scanning device comprising:
    a document detector; and
    an image sensor module, the image sensor module having an image array sensor for scanning information from a side of media;
    wherein as the media is being fed through the scanning device, the scanning device reverses direction of media feeding when the image array sensor detects a trailing end of the media;.
    wherein when the document detector detects the trailing end of the media, the scanning device waits an estimated time just sufficient for the trailing end of the media to almost reach the image array sensor and then begins using the image array sensor to check for the trailing end of the media; and wherein when the scanning device estimates, based on when the document detector detects the trailing end of the media, that the trailing end of the media has passed the image array sensor, the scanning device reverses direction of media feeding even though the image array sensor did not detect the trailing end of the media.

13. A method for scanning media comprising:

upon a document detector detecting media, feeding the media through a scanning device;

upon an image array sensor within the scanning device detecting a trailing end of the media, reversing direction of media feeding so that the media exits the scanning device at the same opening the media entered the scanning device; and, when the document detector detects the trailing end of the media, scanning an additional length of the media just sufficient for the trailing end of the media to almost reach the image array sensor and then beginning to use the image array sensor to check for the trailing end of the media.

14. A method as in claim 13:

wherein feeding the media through a scanning device is accomplished using a pair of input rollers; and wherein reversing direction of media feeding is accomplished using a second pair of rollers.

15. A method as in claim 13 additionally comprising:

simultaneously scanning two sides of the media as the media is fed through the scanning device.

16. A method for scanning media comprising:

upon a document detector detecting media, feeding the media through a scanning device;

detecting when the trailing end of the media passes the document detector;

estimating, based on when the trailing end of the media passed the document detector, when the trailing end of the media will almost reach an image array sensor within the scanning device;

when it is estimated that the trailing end of the media has almost reached the image array sensor, beginning to use the image array sensor to check for the trailing end of the media; and upon the image array sensor detecting a trailing end of the media, reversing direction of media feeding so that the media exits the scannin device at the same opening the media entered the scanning device.

17. A method as in claim 16 additionally comprising:

estimating, based on when the trailing end of the media passed the document detector, when the trailing end of the media has passed the image array sensor; and when it is estimated, based on when the trailing end of the media passed the document detector, that the trailing end of the media has passed the image array sensor, reversing direction of media feeding even though the image array sensor did not detect the trailing end of the media.

18. A method for scanninq media comprising:

upon a document detector detecting media, feeding the media through a scanning devce;

detecting when the trailing end of the media passes the document detector;

estimating, based on when the trailing end of the media passed the document detector, when the trailing end of the media has passed the image array sensor; and, when it is estimated, based on when the trailing end of the media passed the document detector, that the trailing end of the media has passed the image array sensor, reversing direction of media feeding, even though the image array sensor did not detect the trailing end of the media, so that the media exits the scanning device at the same opening the media entered the scanning device.

* * * * *